UNITED STATES PATENT OFFICE.

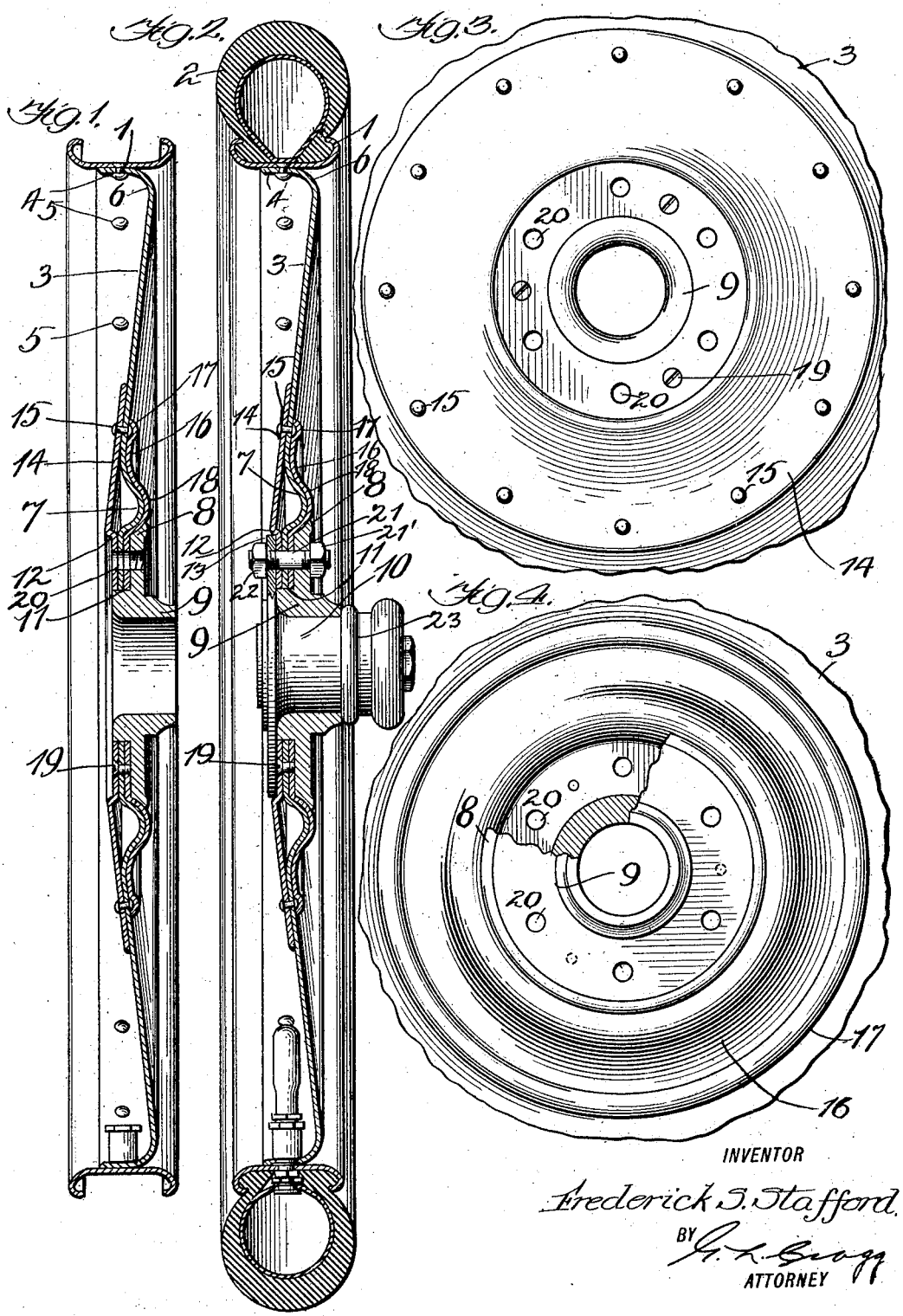

FREDERICK S. STAFFORD, OF CHICAGO, ILLINOIS, ASSIGNOR TO HENRY G. SAAL, OF CHICAGO, ILLINOIS.

WHEEL.

1,399,410.  Specification of Letters Patent.  Patented Dec. 6, 1921.

Application filed April 16, 1920. Serial No. 374,306.

*To all whom it may concern:*

Be it known that I, FREDERICK S. STAFFORD, citizen of the United States, residing at Chicago, in the county of Cook and State of Illinois, have invented a certain new and useful Improvement in Wheels, of which the following is a full, clear, concise, and exact description.

My invention relates to vehicle wheels and is of particular service in the manufacture of wheels for motor vehicles. The wheel, in the preferred embodiment of the invention, is of such design that it may also be used in reconstructing existing motor vehicle wheels, being of particular service in transforming wheels having wooden spokes into wheels with disks intervening between the wheel hubs and rims.

One feature of the invention relates in particular to the assembly of the rim of a wheel with a disk that is to couple this rim with the hub portion of the wheel. In carrying out this feature of the invention the disk is curled into a flange at the periphery thereof, this flange being riveted or otherwise fastened to the wheel rim. Such wheel rim may be constructed to receive a pneumatic or other cushion tire.

The invention has as another of its characteristics the provision of an improved assembly of the wheel disk with the hub portion of the wheel. A wide ring, concentric with the wheel axis is riveted or otherwise secured to the wheel disk and is provided with a shouldered portion that is seated upon a hub shoulder. There are preferably two rings, of somewhat different design, thus assembled with the wheel disk and hub, the wheel disk being sandwiched in between the two rings and having a shouldered portion seated upon a shouldered portion of one of the wide rings. Where the invention is to be embodied in a converted wheel structure the hub portion that supports the wheel disk in the manner above set forth or otherwise, is a hub sleeve whose bore is adapted to receive the hub of the wheel that is to be reconstructed, the diameter of this bore varying with the diameters of the hubs of the various makes of wheels that are to be converted.

I will explain my invention more fully by reference to the accompanying drawing in which Figure 1 illustrates a wheel rim, a wheel disk, wide rings between which the wheel disk is sandwiched in the neighborhood of the wheel hub, and a hub sleeve all assembled into a single unitary structure adapted to be slipped upon the hub of a wheel that is to be converted, the shape and size of the wheel hub corresponding to the shape and size of the hub sleeve; Fig. 2 illustrates the structure of Fig. 1 assembled with a pneumatic tire and a wheel hub; Fig. 3 is a view of the central portion of the structure looking at the left hand side thereof as it appears in Fig. 1; and Fig. 4 is a view of the structure as it appears in Fig. 1 looking toward the right hand side thereof, parts being broken away.

Like parts are indicated by similar characters of reference throughout the different figures.

The metal wheel rim 1 illustrated is preferred but the invention is not to be limited thereto. This rim has its edges curled toward each other to form a tire receiving groove in which the correspondingly shaped base portion of the pneumatic or other tire 2 is received. A disk 3, preferably metal, unites the rim with the metal hub portion of the wheel, this rim being preferably curled at its peripheral portion to form a flange 4 which is fastened to the rim by means of rivets 5 or otherwise. The fastening devices 5 are desirably disposed in a zone that is midway between the edges of the rim. The disk 3 is so curled that the flange 4 is presented for assembly with the rim in the zone of the fastening devices, the flanges being joined with the balance of the disk by the curled portion 6 of the disk. The disk is of a slightly conical formation so that it may extend from one side of the zone containing the fastening devices 5 to the other side of such zone so as to be positioned properly to transmit load strains between the wheel rim and wheel hub. The curling at 6 affords an assembly between the disk 3 and the rim 1 that prevents the fracture or undue strain at the place of junction of the disk with its flange 4.

The central portion of the disk 3 is bulged, preferably outwardly, as indicated at 7 to form a shoulder which is supported upon a shoulder portion 8 of the hub structure which, in the preferred embodiment of the invention, includes a hub sleeve 9 adapted to be supported upon a hub proper 10. Whether the elements 9 and 10 be separately made or are formed in one integral structure, the part 9 is preferably formed with an annular seat 11 upon which the inner edge of the disk 3 is seated. The wheel disk 3 is desirably provided with another shoulder 12 which is seated upon a hub shoulder 13. The shoulder 12 is formed in a separate and wide metallic ring 14 that is preferably riveted to the disk 3 by an annular row of rivets 15 concentric with the hub axis. The rivet heads upon the outer face of the wheel are preferably to be concealed, a result that is desirably to be secured by employing another wide metallic ring 16, that is disposed upon the outer face of the disk 3 and is provided with an annular pocket 17 receiving the heads of the rivets 15 that are at the outer face of the disk. This additional metal ring preferably elsewhere conforms in shape to the shape of the central portion of the disk, being provided with a shouldered formation 18 that is interposed between the shouldered formation 7 and the hub shoulder 8, shoulder 7 being supported upon the shoulder 8 by resting upon and within the shoulder 18 that in turn rests directly upon the shoulder 8.

The disk 3 and the wide rings 14 and 16 between which the disk is sandwiched are maintained in assembly by the screws 19 that engage the rings near the hub sleeve and clamp the central portion of the disk between these rings, the rivets 15 directly assembling only the ring 14 with the disk.

Openings 20 are formed through the wide rings and disk and through the hub flange or shoulder 8 for the purpose of receiving the shanks of clamping bolts 21 that are preferably provided each with nuts upon both of its ends. By thus forming each bolt with two nuts the bolt shank may be threaded into the hub flange 8 to be locked into firm engagement therewith by the nut 21', the remaining nut 22 serving to maintain the structure illustrated in Fig. 1 in assembly with the hub structure 10—13 illustrated in Fig. 2.

The unit illustrated in Fig. 1 with bolts 21 and nuts 21' added thereto as described, the nuts 22 being absent, may be slipped upon the hub 10 when the hub cap 23 is removed, the unit being turned upon the hub 10 until the bolts 21 are brought into alinement with holes formed in the hub shoulder or flange 13 whereafter the movement of the unit further upon the hub is effected to pass the shanks of the bolts through said holes in the flange 13 following which nuts 22 are applied to clamp the unit of Fig. 1 into assembly with the hub element 10 of Fig. 2 whereafter the hub cap 23 is applied in the usual way.

While I have herein shown and particularly described the preferred embodiment of my invention I do not wish to be limited to the precise details of construction shown as changes may readily be made without departing from the spirit of my invention but having thus described my invention I claim as new and desire to secure by Letters Patent the following:—

1. A wheel having a disk whose central portion is provided with a shoulder seated upon a shoulder which is provided upon the wheel hub; and a ring secured to the disk against one face thereof and provided with a shoulder seated upon a second shoulder with which the hub is provided.

2. A wheel having a disk whose central portion is provided with a shoulder seated upon a shoulder which is provided upon the wheel hub; a ring secured to the disk against one face thereof and provided with a shoulder seated upon a second shoulder with which the hub is provided; and a second ring secured against the other face of the disk and covering the place of union of the disk with the first ring, this second ring being interposed between the shoulder upon the disk and the hub shoulder supporting this disk shoulder.

3. In a wheel structure, the combination with a disk; of a hub sleeve assembled with said disk; and a hub upon which the hub sleeve is placed, said hub and hub sleeve having flanges between which said disk is clamped.

4. In a wheel structure, the combination with a disk; of a hub sleeve assembled with said disk; and a hub upon which the hub sleeve is placed, said hub and hub sleeve having flanges between which said disk is clamped, said hub having a removable cap between which and the flange on the hub said hub sleeve is held.

5. In a wheel structure, the combination with a disk; of a hub sleeve assembled with said disk; and a hub upon which the hub sleeve is placed, said disk being provided with a shoulder seated upon a shoulder provided upon the hub structure.

6. In a wheel structure, the combination with a disk; of a hub sleeve assembled with said disk; and a hub upon which the hub sleeve is placed, said hub and hub sleeve having flanges between which said disk is clamped, said disk carrying shoulders respectively seated upon shoulders provided upon said hub sleeve and hub.

7. In a wheel structure, the combination with a disk; of a hub sleeve assembled with said disk; and a hub upon which the hub sleeve is placed, said hub and hub sleeve having flanges between which said disk is clamped, said disk carrying shoulders respectively seated upon said flanges.

8. In a wheel structure, the combination with a disk; of a hub sleeve assembled with said disk; a hub upon which the hub sleeve is placed, said hub and hub sleeve having flanges between which said disk is clamped; a ring secured to the disk against one face thereof and provided with a shoulder seated upon one of said flanges; and a second ring secured against the other face of the disk and covering the place of union of the disk with the first ring and having a shoulder seated upon the remaining flange, said disk also having a shoulder seated upon the shoulder of the second ring, both of said rings being clamped between said flange together with the disk.

In witness whereof, I hereunto subscribe my name this 14th day of April, A. D. 1920.

FREDERICK S. STAFFORD.